United States Patent [19]
Weishaupt

[11] Patent Number: 6,121,872
[45] Date of Patent: Sep. 19, 2000

[54] OBJECT SENSING DEVICE FOR MOTOR VEHICLES

[75] Inventor: Walter Weishaupt, München, Germany

[73] Assignee: Bayerische Motoren Werke AG, Munich, Germany

[21] Appl. No.: 08/169,959

[22] Filed: Dec. 20, 1993

Related U.S. Application Data

[63] Continuation of application No. 07/768,224, Dec. 16, 1991, abandoned.

[30] Foreign Application Priority Data

Apr. 15, 1989 [DE] Germany .............................. 39 12 398
Apr. 14, 1990 [WO] WIPO ...................... PCT/EP90/00591

[51] Int. Cl.$^7$ ..................................................... B60Q 1/00
[52] U.S. Cl. ......................... 340/435; 340/436; 340/903; 340/933
[58] Field of Search .................................. 340/901, 903, 340/904, 905, 906, 907, 933, 942, 435, 436

[56] References Cited

U.S. PATENT DOCUMENTS

| | | | |
|---|---|---|---|
| 4,026,654 | 5/1977 | Beaurain | 340/903 |
| 4,102,426 | 7/1978 | Walden | 180/169 |
| 4,383,238 | 5/1983 | Endo | 340/901 |
| 4,447,800 | 5/1984 | Kasuya et al. | 340/901 |
| 4,551,722 | 11/1985 | Tsuda et al. | 340/904 |
| 4,849,731 | 7/1989 | Melocik | 340/435 |
| 5,059,946 | 10/1991 | Hollowbush | 340/903 |

*Primary Examiner*—Edward Lefkowitz
*Attorney, Agent, or Firm*—Evenson, McKeown, Edwards & Lenahan, PLLC

[57] ABSTRACT

An object sensing device and method for a motor vehicle utilizes one or more transmitter/receiver pairs to obtain a reflex signal from an object from an object situated in front of the motor vehicle in terms of the driving directions. In a first operating mode for clear visibility, a reflex signal is emitted for the object when it is standing still or driving more slowly relative to the motor vehicle containing the device. In a second operating mode for poor visibility the reflex signal is additionally emitted when the object is sensed as coming toward the motor vehicle.

3 Claims, 1 Drawing Sheet

OBJECT SENSING DEVICE FOR MOTOR VEHICLES

This application is a continuation of application Ser. No. 07/768,224, filed on Dec. 16, 1991 now abandoned.

BACKGROUND AND SUMMARY OF THE INVENTION

The present invention relates to an object sensing device for motor vehicles, and, more particularly, to a device having a transmitter/receiver pair for a reflex signal formed by an object situated in the driving direction, having a first operating mode for clear visibility and a second operating mode for poor visibility.

Known object sensing devices have the purpose of sensing obstacles in front of the motor vehicle and, if necessary, triggering the necessary measures. This includes the indicating of an imminent collision as well as, for example, an automatic brake intervention by way of which the motor vehicle is stopped in time. Corresponding devices are known, for example, from the applicant's German Patent DE-OS 37 01 340.

Although known devices offer a maximum of comfort because it is not necessary for the vehicle user to intervene in any way, a problem arises in that the emission of a signal as a result of a sensed obstacle takes place too frequently. The reason is that the vehicle user's potential for recognizing an obstacle and avoiding a collision is not taken into account sufficiently.

Swiss Patent CH-A-486702 shows a device in which the two operating modes are carried out by a varying amplification control of the receiver as a function of the respective visual range. Thus, compensation can be made for the effects of atmospheric or meteorological obstacles, such as layers of haze, rain clouds or snow clouds.

German Patent DE-A 32 22 263 shows a distance warning system for motor vehicles in which a radar system has a plain and a selective monitoring mode. The plain mode is present during straight-ahead driving at a relatively high speed, for example, on a turnpike; the selective monitoring mode is present in complex street traffic, that is, typically in city traffic. In the plain monitoring mode, on one hand, all vehicles are detected which drive ahead at the same speed or more slowly and which are standing and which come toward the vehicle. During the selective monitoring mode, on the other hand, only vehicles are taken into account which drive ahead at the same speed or at a slower speed.

The present invention has an objective of providing an object sensing device for motor vehicles which points out a threatening obstacle only if it is actually necessary.

The foregoing object has been achieved in accordance with the present invention by providing a signal emission for a first operating mode in the case of clear visibility for an object that is standing or is driving more slowly in the direction of motion of the motor vehicle, but not for an object which comes toward the motor vehicle, and for a second operating mode in the event of poor visibility, a signal emission also for an object coming toward the motor vehicle.

The present invention recognizes a distinction between different possible visibility conditions. In the case of operating mode I, clear visibility is assumed. In this mode, the vehicle user, as a rule, has the comprehensive potential of recognizing an obstacle in the form of standing or moving objects and of himself taking the corresponding measures for avoiding a collision. A signal is emitted only in a case in which he is overlooking an object which stands in front of him or moves in front of him at a reduced speed.

In the second operating mode II of the device, it is assumed that the visibility is poor. The vehicle user's perception is severely limited. Virtually every object that is sensed by the device represents a danger and must be signalled to the vehicle user.

Frequently, object sensing devices have a relatively large range. For the operating mode II, this means that relatively many, possibly even unnecessarily many object are sensed and a signal is emitted frequently. This can be prevented if the distance range can be selected within which an object is taken into account. The possibility exists in this case to adjust the distance range manually. This results in the advantage that the vehicle user receives responsibility and is caused to select his driving method consciously corresponding to the adjusted distance.

However, it is also possible to select the distance range automatically, for example, as a function of the vehicle speed. This may take place, for example, by means of an adjustment of the distance range (in meters) corresponding to half the vehicle speed (in km/h).

For mode I, it is assumed that relatively small obstacles, for example, objects on the side of the road, such as warning markers, parked vehicles, developments, etc., are, as a rule, recognized by the vehicle user himself, and he will control his vehicle correspondingly. Only actually critical objects are signalled which the vehicle user should perceive but does not notice at the moment because of a distraction or the like.

In order to better meet this requirement, also in the case of mode I, those objects are critically evaluated whose relative speed is equal to the vehicle speed and which are present continuously or always in the case of successive measuring operations. This applies in the case of an object standing in front of the motor vehicle, such as another motor vehicle or a wall.

Corresponding to an improvement of the invention, the device must also sense objects which move toward the motor vehicle and which have a specific size; this may, for example, be an obstacle which stands in the road. In this case, the process provides the use of two transmitter/receiver pairs which are aligned with scanning areas connected with one another. An object will be classified as being critical when both pairs receive a reflex signal from the same distance. As a result, smaller obstacles can easily be blanked out. They are recorded by only one transmitter/receiver pair.

BRIEF DESCRIPTION OF THE DRAWINGS

These and further objects, features and advantages of the present invention will become more apparent from the following detailed description of currently preferred embodiments when taken in conjunction with the accompanying drawings wherein.

DETAILED DESCRIPTION OF THE DRAWINGS

Figure 1:
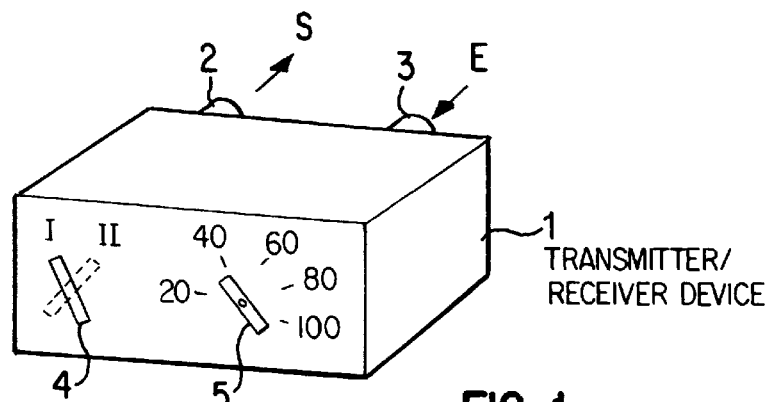
FIG. 1 is a schematic perspective view of a first embodiment of the present invention.

In the embodiment according to FIG. 1, the device is constructed as a compact structural unit which may be arranged behind a windshield of the motor vehicle (not shown). It has a transmitter 2 for one or several infrared luminous beams and a receiver 3 for the reflex signals reflected by an object situated in the driving direction.

The reflex signals are received by the receiver 3. In the case of a falling-below a given safety distance, a corresponding warning or safety measure is triggered.

It is essential for the device that it has two operating modes I and II. In operating mode I, visibility is clear; in operating mode II, the visibility is poor. The switching-over between the two modes may take place automatically, for example, as a function of a conventional fog sensor or the like (not shown), or manually by an operating mode selector 4. As a function of the adjustment of the selector 4, a warning or safety measure is triggered only when it is actually necessary.

This will take place for mode I when the reflex signal receives an object which, relative to the vehicle speed, has a relative speed which is lower than the vehicle speed. Objects whose relative speed is higher than or equal to the vehicle speed are not classified to be critical. These include warning markers, trees or the like on the side of the road as well as vehicles in front of the motor vehicle whose speed is equal to or higher than the vehicle speed.

In the case of mode II, all objects which supply a reflex signal are classified as being critical. Only objects whose relative speed is higher than the vehicle speed (faster vehicles driving ahead) are recorded as not being critical.

An exception in this case are objects which always furnish a reflex signal and correspond to an object whose distance decreases toward the motor vehicle.

In order to sense only objects which are in fact at a critical distance, a rotary-type switch 5 is also provided by way of which the distance range can be adjusted manually. In the illustrated case, for example, only objects are sensed as being critical whose distance is less than 40 m in front of the vehicle.

It is ensured as a result of the manual adjustment of the operating mode selector 4 as well as of the rotary-type switch 5 that the driver is always aware of the fact that the device does not operate completely automatically but that the driver also has to take some of the responsibility and has to adapt his driving method to the respective conditions.

In position II of the operating mode selector 4, poor visibility is assumed. All obstacles are classified as being critical as long as their relative speed is not higher than that of the motor vehicle, and the warning or emergency measure is triggered.

It is also easily possible, while maintaining the basic concept of the present invention, to signal an obstacle only when this is required in order to make the vehicle user aware of his responsibility to offer additional help. For example, by means of the transmitter/receiver pair or by means of another device, such as the mentioned fog sensor, when poor visibility is in fact recognized, a corresponding indication or an acoustical warning may be given to switch the operating mode selector over from the position for mode I into the position for mode II.

Figure 2:
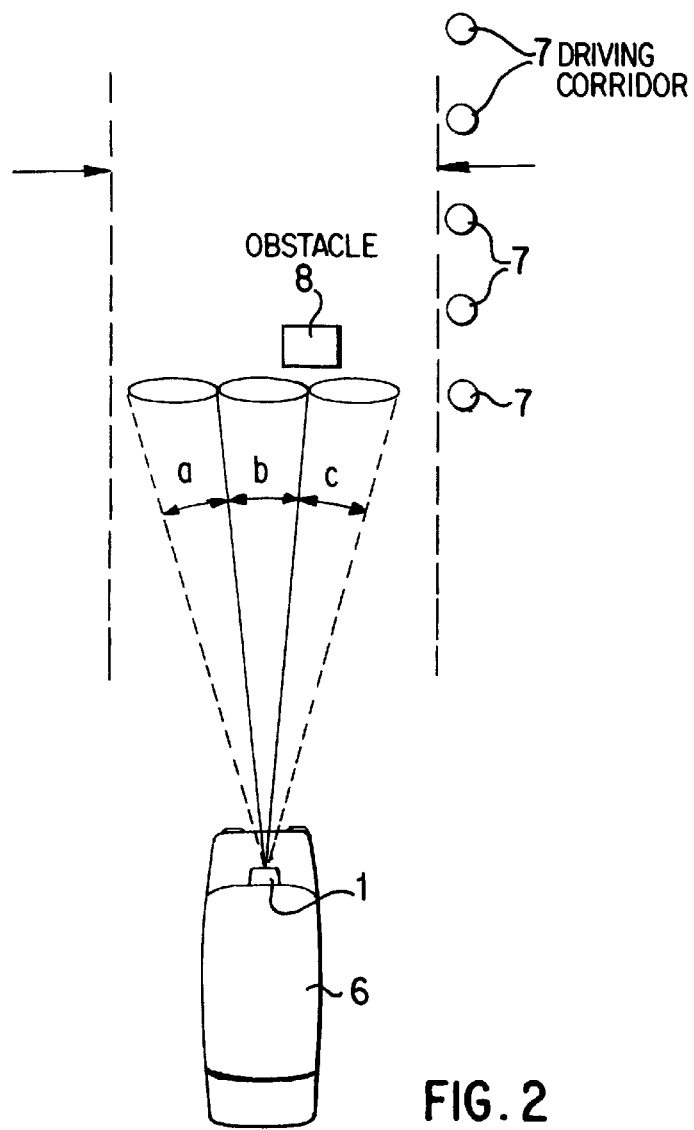
FIG. 2 is a diagram showing a second embodiment of an object sensing device according to the present invention in which three beams emitted from three transmitter/receiver pairs are illustrated but the reflected beams are omitted for sake of clarity.

The embodiment of FIG. 2 shows a top view of a roadway. A motor vehicle 6 is situated on the roadway which has at least two, even three visual ranges a, b, c, which connect to one another. This are observed by individual transmitter/receiver pairs. In position I, the trees 7 on the side of the road are classified as being uncritical. They have a relative speed which is equal to the vehicle speed. Since, however, they are, sensed by only one transmitter receiver pair, it is assumed that they are small negligible obstacles on the side of the road which do not represent any danger.

With larger obstacles 8 situated, for example, in the roadway, it is required that this be indicated to the vehicle user. The criterion is that two receivers receive from adjacent scanned areas a reflex signal of one and the same object whose relative speed is less than or equal to the vehicle speed. The equal relative speed applies when a standing vehicle or a larger obstacle in the roadway is involved. The lower relative speed applies when the vehicle which is driving ahead has a lower speed than the vehicle speed. In both cases, it is in fact necessary to trigger corresponding measures. For this purpose, the vehicle user receives a corresponding warning by way of the device according present invention.

Also, with a multi-beam system, as illustrated in FIG. 2, in the case of mode II (poor visibility), an object sensing will be required if an object is situated in the scanned area of at least one of the transmitter/receiver pairs and this object has a relative speed which is less than, equal too or higher than the vehicle speed. The process according to the invention will report all obstacles, for example, also trees on the side of the road.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An object sensing device for a motor vehicle, comprising at least one transmitter/receiver pair operatively located in the motor vehicle to obtain a reflex signal from an object situated in a driving direction of the motor vehicle and having a first operating mode for clear visibility and a second operating mode for poor visibility, wherein the at least one transmitter/receiver pair is operatively configured such that a signal emission occurs for the first operating mode when an object is standing or is driving more slowly in the driver's direction of the motor vehicle, but not when an object comes toward the motor vehicle and, for the second operating mode, when an object is standing or is driving more slowly in the driver's direction of the motor vehicle and when an object comes toward the motor vehicle.

2. The object sensing device according to claim 1, wherein several pairs of transmitter/receivers are provided so as to be aligned with different visual ranges such that the signal emission occurs when two receivers of two of the pairs observe an object at approximately the same distance whose relative speed is one of lower than, equal to, and higher than the vehicle speed.

3. A method for sensing an object situated in front of a motor vehicle, comprising the steps of emitting a signal in a first operating mode characteristic of clear visibility only when the object is standing still or is driving more slowly relative to the motor vehicle, switching to a second operating mode characteristic of poor visibility, emitting a signal in the second operating mode when the object is standing still, driving more slowly relative to the motor vehicle, and coming toward the motor vehicle, and receiving a signal reflected from the object in one of the first operating mode and the second operating mode.

* * * * *